United States Patent
Kersters

(10) Patent No.: US 9,063,744 B2
(45) Date of Patent: Jun. 23, 2015

(54) MODIFYING A FILE WRITTEN IN A FORMAL LANGUAGE

(75) Inventor: Christian J. Kersters, Donceel (BE)

(73) Assignee: CA, Inc., Islandia, NY (US)

( * ) Notice: Subject to any disclaimer, the term of this patent is extended or adjusted under 35 U.S.C. 154(b) by 2147 days.

(21) Appl. No.: 11/426,396

(22) Filed: Jun. 26, 2006

(65) Prior Publication Data

US 2007/0300212 A1    Dec. 27, 2007

(51) Int. Cl.
*G06F 9/45* (2006.01)
*G06F 9/44* (2006.01)

(52) U.S. Cl.
CPC . *G06F 8/36* (2013.01); *G06F 8/427* (2013.01)

(58) Field of Classification Search
USPC ................................. 717/144, 143
See application file for complete search history.

(56) References Cited

U.S. PATENT DOCUMENTS

| | | | | |
|---|---|---|---|---|
| 5,107,497 A * | 4/1992 | Lirov et al. | ...................... | 714/26 |
| 5,687,378 A * | 11/1997 | Mulchandani et al. | ........ | 717/131 |
| 5,812,853 A * | 9/1998 | Carroll et al. | ................. | 717/143 |
| 5,860,011 A * | 1/1999 | Kolawa et al. | ................. | 717/142 |
| 5,970,490 A * | 10/1999 | Morgenstern | ......................... | 1/1 |
| 6,085,029 A * | 7/2000 | Kolawa et al. | .................. | 714/38 |
| 6,286,138 B1 * | 9/2001 | Purcell | ......................... | 717/143 |
| 6,378,126 B2 * | 4/2002 | Tang | ............................. | 717/143 |
| 7,263,691 B2 * | 8/2007 | Vehkomaki | ................... | 717/140 |
| 2005/0262056 A1 * | 11/2005 | Hamzy et al. | ..................... | 707/3 |

* cited by examiner

*Primary Examiner* — Hang Pan
(74) *Attorney, Agent, or Firm* — Baker Botts L.L.P.

(57) ABSTRACT

In certain embodiments, a method for modifying a file written in a formal language comprises: (1) parsing an input file written in a formal language to generate a data structure of the input file; (2) issuing, during generation of the data structure, one or more queries to a rule engine for evaluation of one or more rules for modifying the input file; and (3) generating the data structure according to the evaluation of the one or more rules.

36 Claims, 6 Drawing Sheets

TO FIG. 4B

MODIFYING A FILE WRITTEN IN A FORMAL LANGUAGE

TECHNICAL FIELD

The present invention relates generally to computer programming and more particularly to modifying a file written in a formal language.

BACKGROUND

Files such as computer programs are often written in a formal language. It may be desirable to modify a file written in a formal language. As just one example, it may be desirable to modify the code of a computer program that is designed to operate with a first database management system in such a manner that the computer program can operate with another type of database management system.

SUMMARY OF THE INVENTION

According to the present invention, disadvantages and problems associated with previous techniques for modifying a file written in a formal language may be reduced or eliminated.

In certain embodiments, a method for modifying a file written in a formal language comprises: (1) parsing an input file written in a formal language to generate a data structure of the input file; (2) issuing, during generation of the data structure, one or more queries to a rule engine for evaluation of one or more rules for modifying the input file; and (3) generating the data structure according to the evaluation of the one or more rules.

In certain embodiments, a system for modifying a file written in a formal language comprises a rule engine and a parser. The rule engine comprises one or more rules for modifying an input file written in a formal language. The parser is operable to: (1) parse the input file written in the formal language to generate a data structure of the input file; (2) issue, during generation of the data structure, one or more queries to the rule engine for evaluation of one or more rules for modifying the input file, the rule engine operable to evaluate the one or more rules in response to the one or more issued queries and to return a query result to the parser; and (3) generate the data structure according to the query result returned by the rule engine.

Particular embodiments of the present invention may provide one or more technical advantages. Conventional systems for modifying a file written in a formal language typically involve either a text-based approach or a semantic approach. The text-based approach generally considers the input file as a stream of characters and performs what are usually simple changes based on a recognition of character patterns. The semantic approach applies a lexical analysis and parsing of the input file and transforms the input file based on syntactic patterns. The semantic approach may allow matching based on higher-level patterns relative to the text-based approach. The semantic approach usually involves tightly mixing lexical analysis and parsing with the desired modification of the input file, which may make it difficult to maintain and reuse as the modification rules are interspersed with the parser code. For example, each time a different modification is to be made, it may be necessary to recreate the parser to include new modification rules for making the new modification.

In certain embodiments, the present invention fosters reuse and flexibility in formal language processing through separation of duties. For example, by separating the definition and application of the modification rules from the parsing of an input file, the present invention may foster re-use and flexibility in formal language processing. In certain embodiments, the parser may be built once for the formal language of the input file that is being modified rather than multiple times for each set of desired modifications. For example, a generated parser may be used with different sets of modification rules to perform different modifications to files written in the formal language of the input file since the rule processing is performed by a distinct rule engine.

In certain embodiments, the techniques for modifying an input file written in a formal language provided by the present invention are less complex and easier to develop and maintain than a text-based or semantic approach for modifying a file written in a formal language. The present invention may decrease the response time of post processors, by reducing the workload for post processors for example. In certain embodiments, the present invention may be used to enhance code of a computer program.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which.

DESCRIPTION OF EXAMPLE EMBODIMENTS

Figure 1:
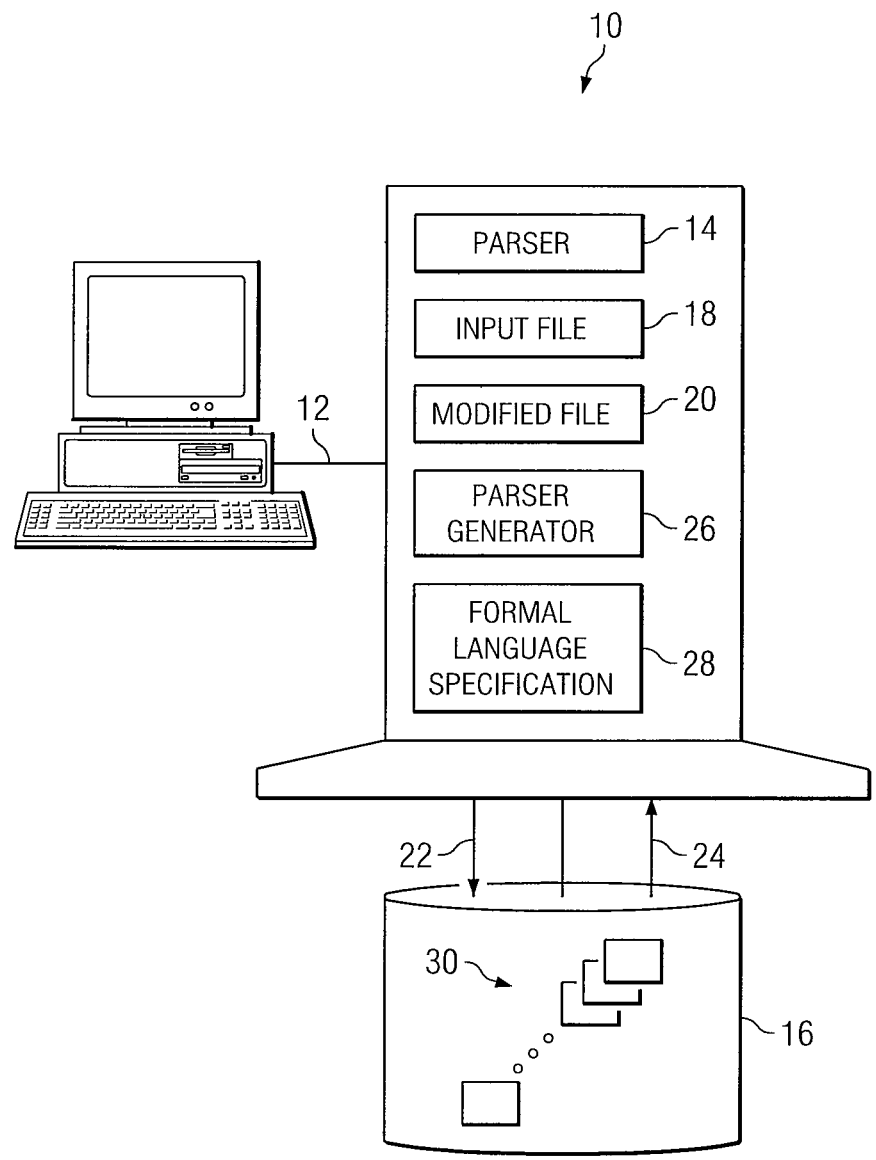
FIG. 1 illustrates an example system for modifying a file written in a formal language.

FIG. 1 illustrates an example system 10 for modifying a file written in a formal language. System 10 comprises a user system 12 that comprises or is otherwise associated with a parser 14 and a rule engine 16. Although this particular implementation of system 10 is illustrated and primarily described, the present invention contemplates any suitable implementation of system 10. In certain embodiments, system 10 could be a distributed environment in which one or more components are provided on a server system that is remote from user system 12.

User system 12 may include one or more computer systems at one or more locations that may share data storage, communications, or other resources according to particular needs. For example, functionality described in connection with user system 12 may be provided using a single or multiple computer systems, which in a particular embodiment might include a conventional desktop or laptop computer, a server or server pool, or a client-server environment. Each computer system may include one or more suitable input devices, output devices, mass storage media, processors, memory modules, interfaces, communication ports, or other appropriate components for receiving, processing, storing, and communicating information according to the operation of system 10. User system 12 may be any suitable computer system or associated users that create, develop, derive, or use computer-implemented files written in a formal language. Where appropriate, reference to user system 12 is meant to include one or more associated human users. Moreover, "user system 12" and "user of user system 12" may be used interchangeably throughout this description.

The one or more processors of each computer system of user system 12 may be a microprocessor, controller, or any other suitable computing device or resource. The one or more processors may work, either alone or with other components of system 10, to provide the functionality of system 10 described herein. Additionally, each computer system may include a personal computer, workstation, network computer, kiosk, wireless data port, personal data assistant (PDA), a client-server environment, one or more processors within these or other devices, or any other suitable processing device. As used throughout this description, the term "computer" is intended to encompass any suitable type of processing device.

In general, the present invention enables user system 12 to manually or autonomously modify an input file 18 that is written in a formal language to generate a modified file 20. Although input file 18 and modified file 20 are referred to in the singular, the present invention contemplates one or more input files 18 and one or more modified files 20. Input file 18 and modified file 20 may be stored, either temporarily or permanently, in any suitable type of memory module that is a part of or otherwise accessible to user system 12.

Input file 18 may include any suitable type of computerized data stream or other computerized collection of data that is written in a formal language. For example, input file 18 may include a computer program, a stream of characters, a document, a spreadsheet, or any other suitable type of data that is written in a formal language. In certain embodiments, input file 18 may be received by user system 12 over a network. The term "file," as used throughout this description, is meant to include any suitable type of input stream or other collection of data, at least a portion of which is written in a formal language.

As described above, input file 18 may be written in a formal language. In certain embodiments, a formal language comprises a set of finite-length words (e.g., character strings) taken from a finite alphabet, although those of ordinary skill in the art will appreciate that any suitable formal language may be used without departing from the spirit and scope of the present invention. For example, in embodiments in which input file 18 comprises a computer program, the computer program may comprise computer code written in a formal language such as a computer programming language. Example formal languages for a computer program may include C, C++, JAVA, COBOL, or any other suitable programming language. Although example programming languages are described, the present invention contemplates the formal language of a computer program comprising any suitable programming language. Additionally, although input file 18 is primarily described as a computer program written in a programming language, the present invention contemplates input file 18 comprising any suitable type of file written in any suitable type of formal language.

Input file 18 may be modified to generate modified file 20 for any suitable purpose using the present invention. Modified file 20 may include any suitable modified version of input file 18. For example, modifying input file 18 may include adding to input file 18, deleting from input file 18, changing input file 18, or performing any other suitable type of modification. As a particular example, in embodiments in which input file 18 comprises a computer program, the modification may include adding to the computer code of input file 18 (e.g., for adding to functionality of the computer program, for enhancing functionality of the computer program, or for any other suitable purpose), deleting source code from input file 18 (e.g., for removing functionality from the computer program or for any other suitable purpose), changing the source code of input file 18 (e.g., for altering the compatibility of the computer program or for any other suitable purpose), or performing any other suitable type of modification. As just one example, input file 18 may comprise a computer program that is operable to interact with a first type of database management system, and it may be desirable to modify the computer program to be operable to interact with a second type of database management system.

Parser 14 is operable to parse input file 18 in order to determine its grammatical structure with respect to a particular formal language specification. Parser 14 may generate a parse tree or other suitable data structure based on the parsing of input file 18. Although the present description primarily focuses on embodiments in which the data structure generated by parser 14 comprises a parse tree, the present invention contemplates parser 14 generating any suitable data structure for representing input file 18 according to a formal language specification for the formal language of input file 18. In certain embodiments, parser 14 parses input file 18 to identify the meaningful tokens within input file 18 and builds the parse tree from one or more of the identified tokens. The terms "parsing" and "parser" may also be referred to as syntax analysis and syntax analyzer, respectively.

In certain embodiments, parser 14 is operable to communicate one or more queries 22 to rule engine 16 for evaluation of one or more rules. For example, during generation of the parse tree for input file 18, parser 14 may issue one or more queries 22 to rule engine 16 for evaluation of one or more rules. In certain embodiments, as parser 14 is generating the parse tree for input file 18 and prior to adding a node to the parse tree, parser 14 may issue one or more queries 22 to rule engine 16 for evaluation of one or more rules. Prior to sending each query 22, parser 14 may gather any relevant data to be sent along with query 22, as one or more parameters of query 22 for example. In certain embodiments, the source code of parser 14 may comprise one or more language modification hooks that cause parser 14 to issue queries 22 (e.g., prior to adding a node to the parse tree).

Parser 14 may receive a query result 24 from rules engine 16. Query result 24 may include an identification of the action resulting from query 22, any suitable details associated with the action, and any other suitable information. Example actions of the rules are described in more detail below. Parser 14 may execute the action when the rule is fired. In particular, parser 14 may generate the relevant portion of the parse tree according to query result 24. For example, parser 14 may generate the node according to query result 24 (which may include determining that the node should not be generated).

In certain embodiments, user system 12 comprises a parser generator 26 that is operable to generate parser 14. Parser generator 26 may comprise a JAVA Compiler-Compiler (JAVACC), LEX, Yet Another Compiler-Compiler (Yacc), Sable Compiler-Compiler (SableCC), Another Tool For Language Recognition (ANTLR), or any other suitable parser generator according to particular needs. For example purposes only, the present description primarily focuses on embodiments in which parser generator 26 comprises a JAVACC.

In certain embodiments, parser generator 26 generates parser 14 according to a formal language specification 28 for the formal language of input file 18. For example, parser generator 26 may generate the source code for parser 14 from the formal language specification 28 for the formal language of input file 18. Formal language specification 28, which may also be referred to as a grammar or grammar specification, may be defined for representing the formal language of input file 18. Formal language specification 28 may be defined using any suitable notation, according to particular needs. As just one example, formal language specification 28 may be defined using the Extended Backus-Naur Form (EBNF) notation. EBNF notation is widely used to describe formal language syntax, which may make it desirable to begin the process with an existing EBNF grammar specification. Other example notations for formal language specification 28 may include Backus-Naur Form (BNF), Augmented Backus-Naur Form (ABNF), or any other suitable type of notation for describing a formal language. Formal language specification 28 may be stored as a file on user system 12 or in any other suitable format at any other suitable location.

In certain embodiments, formal language specification 28 may have been developed for a different parser generator than parser generator 26 of system 10. In such embodiments, formal language specification 28 may be ported to the target parser generator (i.e., parser generator 26) and adapted to integrate as much of the language modification hooks for issuing the one or more queries 22.

As an example, using a JAVACC parser generator 26, a formal language specification 28 for the C programming language may include the following:
Terminal symbol specification:
<DECIMALINT•["1"-"9"](["0"-"9"])*(["u","U","l""L"])?>,
Rule specification:

```
void StatementList( ) : { }
{
(Statement( ) | Declaration( ))+
}
```

This rule specification may correspond to the following rule in EBNF:
StatementList::=(Statement|Declaration)+

In certain embodiments, rule engine 16 comprises a database or other suitable memory module that is operable to store and evaluate one or more rules 30. Additionally or alternatively, the present invention contemplates rule engine 16 comprising any suitable number of processors. Rule engine 16 may be integral to or distinct from user system 12 and may be geographically remote from or local to user system 12. In certain embodiments, rule engine 16 is distinct from parser 14.

Rule engine 16 may store one or more rules 30. Rules 30 may specify how an input file 18 is to be modified. Rules 30 may be organized in one or more rule sets. A particular set of rules 30, which may include one or more rules 30, may facilitate the modification of an input file 18 for one or more suitable purposes. Rule engine 16 may be written using ProLog, AION, or any other suitable programming language. In certain embodiments, rules 30 comprise text files; however, the present invention contemplates rules 30 being in any suitable format according to particular needs.

Rules 30 may have any suitable structure, according to particular needs. In certain embodiments, each of rules 30 comprises one or more of a name portion, one or more filters, one or more actions, and one or more details relevant to the one or more actions. Each of these example portions of rules 30 will now be described in the context of an example embodiment in which rules 30 are written in ProLog; however, it should be understood that this is for example purposes only and the present invention is not intended to be so limited.

The name portion of a rule 30 may be used to identify rule 30. For example, ProLog structures may be named according to EBNF production rules. The one or more filters may be used to determine the relevant rules 30 to be evaluated in response to a query 22. For example, a subset of the terminal symbols used to make up the parse tree node for which the one or more rules 30 are being evaluated (i.e., for which the query 22 was issued) may be passed. This subset may be used by rule engine 16 to determine the context and reply to the correct queries 22. The one or more filters may be used to determine whether the action associated with a rule 30 should be triggered in response to query 22.

The one or more actions of a rule 30 may instruct parser 14 as to what action to perform in response to evaluation of rule 30 by rules engine 16. The action may be communicated as part of query result 24. Parser 14 may execute the action when the rule is fired. In certain embodiments, the one or more actions of a rule 30 include one or more of the following: (1) a cancel action instructing parser 14 to stop parsing of input file 18; (2) an add action instructing parser 14 to add some text before the current node; (3) a delete action instructing parser 14 to delete the current node; and (4) an add_after action instructing parser 14 to add some text after the current node. Although these example actions are primarily described, the present invention contemplates rules 30 comprising any other suitable actions for modifying input file 18 according to particular needs. The one or more details relevant to the one or more actions may include any suitable information. For example, if the action is an add action or an add_after action, then the one or more details may include the content of the text to add to the parse tree. As another example, if the action is a cancel action, then the one or more details may include a justification for stopping parsing of input file 18. The one or more details may be included as part of query result 24.

The following are several example rules 30 that are written in ProLog:

'PPDefine'(['#define', 'SQLANYWHERE'], cancel, alreadyProcessed).
'EqualityExpression'(['sqlca', '•', 'sqlcode', '==', _], delete, dummy).
'EqualityExpression'(['sqlca', '•', 'sqlcode', '==', _], add, '((SQLCA *)globdata->psmgr_dasg_data.save_sqlca)->sqlcode == ').

Rule engine 16 may receive queries 22 issued by parser 14, determine one or more appropriate rules 30 to evaluate in response to queries 22 (e.g., based on the one or more filters of rules 30), evaluate the one or more appropriate rules 30, and return a query result 24 to parser 14. Query result 24 may provide a suitable action to be performed by parser 14 in response to evaluation of query 22 by rules engine 16.

Each of parser 14, rules engine 16, and parser generator 26 may comprise any suitable combination of software, firmware, and hardware. Moreover, parser 14, rules engine 16, and parser generator 26 may be packaged as a single component or one or more separate components, according to particular needs.

In operation of an example embodiment of system 10, a formal language specification 28 for the formal language of input file 18 may be defined. As just one example, the formal language specification may comprise the EBNF notation. As described above, in certain embodiments, formal language specification 28 may have been developed for a different parser generator than parser generator 26 of system 10. In such embodiments, formal language specification 28 may be ported to the target parser generator (i.e., parser generator 26) and adapted to integrate one or more language modification hooks for issuing the one or more queries 22.

In certain embodiments, such as might by the case with JAVACC, it may be appropriate to navigate the parse tree and potentially to issue queries 22 at one or more nodes of the parse tree. For example, a "multi-mode parse tree" may be generated. A multi-mode parse tree may comprise one class per rule 30, which may allow processing based on class name in JAVA. "Node scope hooks" may be inserted in the parse tree to trigger specific processing of one or more rules 30 before nodes are attached to the parse tree, which may allow the structure of the parse tree to be dynamically altered, if appropriate. In the JAVACC approach, the code for the main parser class may also be placed in formal language specification 28, which may reduce the effort needed to integrate the processing afterwards.

Parser generator 26 may generate parser 14. For example, parser generator 26 may process formal language specification 28 of the formal language of input file 18 to generate parser 14. The result of the processing of formal language specification 28 by parser generator 26 may be one or more raw parser source files. For example, using a JAVACC parser generator 26, formal language specification 28 may be processed by a JJTREE tool, which may result in an intermediate file. The intermediate file may be processed by JAVACC, which may result in a number of JAVA classes. Processor integration may be performed, which may result in one or more final parser source files. As described briefly above, the one or more files (e.g., raw parser source files) generated by parser generator 26 may be customized to integrate processing logic for the formal language of input file 18, if appropriate.

Parser 14 may be compiled. For example, the one or more final parser source files may be compiled. In certain embodiments, depending on parser generator 26 (and possibly on the intermediate programming language), the generated final parser source files are processed to create an executable parser image. The executable parser image may be compiled and optionally link-edited with one or more relevant libraries, if appropriate. In certain embodiments, for a JAVACC parser generator 26, the final parser source files may be compiled using the JAVAC command, with both the one or more formal language processing classes and the application programming interface (API) to rules engine 16. The compilation of parser 14 may result in a number of JAVA classes.

One or more rules 30 for modification of input file 18 may be defined. Based on the selected rules engine 16 and the scope of the modifications, rules 30 may be defined to alter the parse tree to obtain the desired result (e.g., the desired modified file 20). In certain embodiments, different sets of rules 30 may be used with the same parser 14 to achieve different results (e.g., different modified files 20). For example a first set of rules 30 may be used to perform a first modification to input file 18 to generate a first modified file 20, and a second set of rules 30 may be used to perform a second modification to input file 18 to generated a second modified file 20. In certain embodiments, this capability of system 10 may depend on particular needs and whether the formal language used by the files to be modified is the same. For example, a parser 14 generated according to the present invention may be able to apply different sets of rules 30 to the same input file 18 to achieve different modified files 20. As another example, a parser 14 generated according to the present invention may be able to apply the same or different sets of rules 30 to different input files 18 that are written in the same formal language.

The modification of input file 18 may be performed. In certain embodiments, once the executable parser image has been generated, a set of modification rules 30 may be selected (e.g., depending on the result to be achieved) and applied to input file 18 to result in one or more modified files 20. During processing, the parser 14 may issue one or more queries 22 to rule engine 16. For example, parser 14 may issue one or more queries 22 to rule engine 16 before each node is added to the parse tree generated by parser 14. Parser 14 may collect any suitable information to be sent to rule engine 16 with query 22. For example, parser 14 may collect all of the information relative to the terminal nodes below the node at which query 22 is being issued. Rule engine 16 may evaluate query 22, and when rule engine 16 determines that a corresponding rule 30 is matched, the relevant action data for that rule 30 may be captured and a query result 24 may be returned to parser 14. Parser 14 may generate the parse tree in accordance with the evaluation of rule 30. For example, parser 14 may generate the parser tree in accordance with the action specified in query result 24.

In operation of an example embodiment of system 10, input file 18 may be accessed in any suitable manner, such as being received over a network or accessed from a disk or other suitable memory module (removable or non-removable) of user system 12 for example. In certain embodiments, parser 14 accesses input file 18. Parser 14 may begin parsing input file 18 to generate a parse tree of input file 18. Parser 14 may determine whether parsing of input file 18 is complete. If parser 14 determines that parsing of input file 18 is complete, then modified file 20 may be generated according to the parse tree generated by parser 14.

If parser 14 determines that parsing of input file 18 is not complete, then parser 14 may determine whether there is a node to add to the parse tree. If parser 14 determines that there is not a node to add to the parse tree, then parser 14 may continue parsing input file 18. If parser 14 determines that there is a node to add to the parse tree, then parser 14 may determine whether to issue a query 22 to rule engine 16. In certain embodiments, parser 14 issues a query 22 before adding any node to the parse tree. In such embodiments, there may not be an explicit decision made regarding whether to issue a query 22. In certain other embodiments, parser 14 issues a query 22 only before adding certain nodes to the parse tree. The determination of whether to issue a query 22 before addition of a node to the parse tree may be made according to node scope hooks (e.g., or language modification hooks) inserted in the code of parser 14 by parser generator 26.

If it is determined that a query 22 should not be issued, then parser 14 may add the node to the parse tree and continue parsing input file 18. If it is determined that a query 22 should be issued to rule engine 16, then parser 14 may gather information for query 22. For example, parser 14 may gather any relevant data to be sent along with query 22, as one or more parameters of query 22 for example. As a particular example, the parameters of query 22 may include a subset of the terminal symbols used to make up the parse tree node at which query 22 is being issued. The present invention contemplates parser 14 not gathering any information for query 22 if that is appropriate according to particular needs. Parser 14 may issue query 22 to rule engine 16. The issued query 22 may include a portion or all of the gathered information. Although a single query 22 is primarily described, parser 14 may communicate any suitable number of queries 22 for a given node.

Rule engine 16 may process query 22 received from parser 14 in any suitable manner, according to particular needs. In certain embodiments, rule engine 16 may analyze query 22, determine whether query 22 triggers one or more rules 30. For example, the one or more filters of rules 30 may enable relevant rules 30 to be evaluated in response to a query 22. For example, a subset of the terminal symbols used to make up the parse tree node for which the one or more rules 30 are being evaluated may be passed. This subset may be used by rule engine 16 to determine context and reply to the correct queries 22. The one or more filters may be used to determine whether the action associated with a rule 30 should be triggered in response to query 22.

If rule engine 16 determines that query 22 triggers a particular rule 30, rule engine 16 may determine the action for rule 30 and any suitable details for the action. In certain embodiments, the one or more actions of a rule 30 include one or more of the following: (1) a cancel action instructing parser 14 to stop parsing of input file 18; (2) an add action instructing parser 14 to add some text before the current node; (3) a delete action instructing parser 14 to delete the current node; and (4) an add_after action instructing parser 14 to add some text after the current node. Although these example actions are primarily described, the present invention contemplates rules 30 comprising any other suitable actions for modifying input file 18 according to particular needs. The one or more details relevant to the one or more actions may include any suitable information. For example, if the action is an add action or an add_after action, then the one or more details may include the content of the text to add to the parse tree. As another example, if the action is a cancel action, then the one or more details may include a justification for stopping parsing of input file 18.

Rule engine 16 may communicate a query result 24 to parser 14. Query result 24 may include an identification of the action resulting from query 22, any suitable details associated with the action, and any other suitable information. Parser 14 may generate the relevant portion of the parse tree according to query result 24. For example, parser 14 may generate the node according to query result 24 (which may include determining that the node should not be generated).

Parser 14 may execute the action when the rule gets fired to generate the relevant portion of the parse tree according to query result 24. In certain embodiments, the one or more actions of a rule 30 include one or more of the following: (1) a cancel action instructing parser 14 to stop parsing of input file 18; (2) an add action instructing parser 14 to add some text before the current node; (3) a delete action instructing parser 14 to delete the current node; and (4) an add_after action instructing parser 14 to add some text after the current node. Although these example actions are primarily described, the present invention contemplates rules 30 comprising any other suitable actions for modifying input file 18 according to particular needs. The one or more details relevant to the one or more actions may include any suitable information. For example, if the action is an add action or an add_after action, then the one or more details may include the content of the text to add to the parse tree. As another example, if the action is a cancel action, then the one or more details may include a justification for stopping parsing of input file 18. The one or more details may be included as part of query result 24. Parser 14 may continue parsing input file 18 until parsing is complete.

Particular embodiments of the present invention may provide one or more technical advantages. Conventional systems for modifying a file written in a formal language typically involve either a text-based approach or a semantic approach. The text-based approach generally considers the input file as a stream of characters and performs what are usually simple changes based on a recognition of character patterns. The semantic approach applies a lexical analysis and parsing of the input file and transforms the input file based on syntactic patterns. The semantic approach may allow matching based on higher-level patterns relative to the text-based approach. The semantic approach usually involves tightly mixing lexical analysis and parsing with the desired modification of the input file, which may make it difficult to maintain and reuse as the modification rules are interspersed with the parser code. For example, each time a different modification is to be made, it may be necessary to recreate the parser to include the new modification rules for making the new modification.

In certain embodiments, the present invention fosters reuse and flexibility in formal language processing through separation of duties. For example, by separating the definition and application of modification rules 30 from the parsing of input file 18, the present invention may foster re-use and flexibility in formal language processing. In certain embodiments, parser 14 may be built once for the formal language of input file 18 that is being modified rather than multiple times for each set of desired modifications. For example, a generated parser 14 may be used with different sets of modification rules 30 to perform different modifications to files written in the formal language of input file 18 since the rule processing is performed by a distinct rule engine 16.

In certain embodiments, the techniques for modifying an input file 18 written in a formal language provided by the present invention are less complex and easier to develop and maintain than a text-based or semantic approach for modifying file 18 written in a formal language. The present invention may decrease the response time of post processors, by reducing the workload for post processors for example. In certain embodiments, the present invention may be used to enhance code of a computer program.

Figure 2:
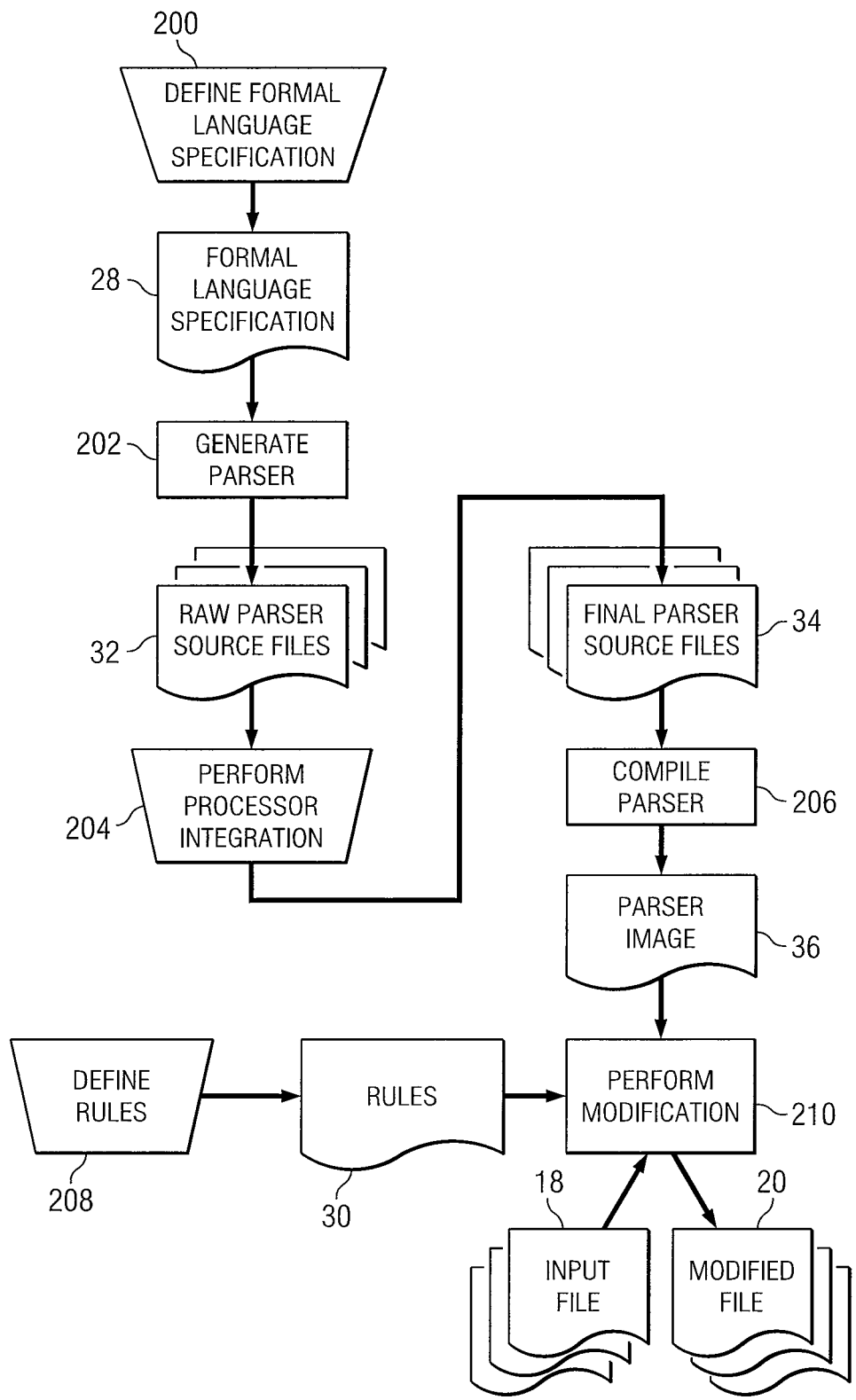
FIG. 2 illustrates an example method for modifying a file written in a formal language according to certain embodiments of the present invention.

FIG. 2 illustrates an example method for modifying a file written in a formal language according to certain embodiments of the present invention. At step 200, a formal language specification 28 for the formal language of input file 18 may be defined. Formal language specification 28 for the formal language of input file 18 may be defined using any suitable notation, according to particular needs. As just one example, the formal language specification may comprise the EBNF notation.

As described above, in certain embodiments, formal language specification 28 may have been developed for a different parser generator than parser generator 26 of system 10. In such embodiments, formal language specification 28 may be ported to the target parser generator (i.e., parser generator 26) and adapted to integrate one or more language modification hooks for issuing the one or more queries 22.

In certain embodiments, such as might by the case with JAVACC, it may be appropriate to navigate the parse tree and potentially to issue one or more queries 22 at one or more nodes of the parse tree. For example, a "multi-mode parse tree" may be generated. A multi-mode parse tree may comprise one class per rule, which may allow processing based on class name in JAVA. "Node scope hooks" may be inserted in the parse tree to trigger specific processing of one or more rules 30 before nodes are attached to the parse tree, which may allow the structure of the parse tree to be dynamically altered, if appropriate. In the JAVACC approach, the code for the main parser class may also be placed in formal language specification 28, which may reduce the effort needed to integrate the processing afterwards.

At step 202, parser generator 26 may generate parser 14. For example, parser generator 26 may process formal language specification 28 of the formal language of input file 18 to generate parser 14. The result of the processing of formal language specification 28 by parser generator 26 may be one or more files in a given programming language. These files may be referred to as raw parser source files 32. For example, using a JAVACC parser generator 26, formal language specification 28 may be processed by a JJTREE tool, which may result in an intermediate file. The intermediate file may be processed by JAVACC, which may result in a number of JAVA classes.

At step 204, processor integration may be performed. This may result in one or more final parser source files 34. As described briefly above, the one or more files (e.g., raw parser source files 32) generated by parser generator 26 may be customized to integrate processing logic for the formal language of input file 18, if appropriate. The amount of customization, if any, may depend on one or more of the following: the chosen parser generator 26; the programming language generated; how the language processing logic was designed; and any other suitable factors. In certain embodiments, with JAVACC and the reflection possibilities of the JAVA programming language, these customizations may be limited to (although not necessarily): copying of a few standard classes in the target environment and creation of a few fields in the standard SimpleNode class.

At step 206, parser 14 may be compiled. For example, the one or more final parser source files 34 may be compiled. In certain embodiments, depending on parser generator 26 (and possibly on the intermediate programming language), the generated final parser source files 34 are processed to create an executable parser image 36. Executable parser image 36 may be compiled and optionally link-edited with one or more relevant libraries, if appropriate. In certain embodiments, for a JAVACC parser generator 26, final parser source files 34 may be compiled using the JAVAC command, with both the one or more formal language processing classes and the API to rules engine 16. The compilation of parser 14 may result in a number of JAVA classes.

At step 208, one or more rules 30 for modification of input file 18 may be defined. Based on the selected rules engine 16 and the scope of the modifications, rules 30 may be defined to alter the parse tree to obtain the desired result (e.g., the desired modified file 20). In certain embodiments, different sets of rules 30 may be used with the same parser 14 to achieve different results (e.g., different modified files 20). For example a first set of rules 30 may be used to perform a first modification to input file 18 to generate a first modified file 20, and a second set of rules 30 may be used to perform a second modification to input file 18 to generated a second modified file 20. In certain embodiments, this capability of system 10 may depend on particular needs and whether the formal language used by the files to be modified is the same. For example, a parser 14 generated according to the present invention may be able to apply different sets of rules 30 to the same input file 18 to achieve different modified files 20. As another example, a parser 14 generated according to the present invention may be able to apply the same or different sets of rules 30 to different input files 18 that are written in the same formal language.

At step 210, the modification of input file 18 may be performed. In certain embodiments, once executable parser image 36 has been generated, a set of modification rules 30 may be selected (e.g., depending on the result to be achieved) and applied to input file 18 to result in one or more modified files 20. During processing, the parser 14 may issue one or more queries 22 to rule engine 16. For example, parser 14 may issue one or more queries 22 to rule engine 16 before each node is added to the parse tree generated by parser 14. Parser 14 may collect any suitable information to be sent to rule engine 16 with query 22. For example, parser 14 may collect all of the information relative to the terminal nodes below the node at which query 22 is being issued. Rule engine 16 may evaluate query 22, and when rule engine 16 determines that a corresponding rule 30 is matched, the relevant action data for that rule 30 may be captured and a query result 24 may be returned to parser 14. Parser 14 may generate the parse tree in accordance with the evaluation of rule 30. For example, parser 14 may generate the parser tree in accordance with the action specified in query result 24.

Figure 3:
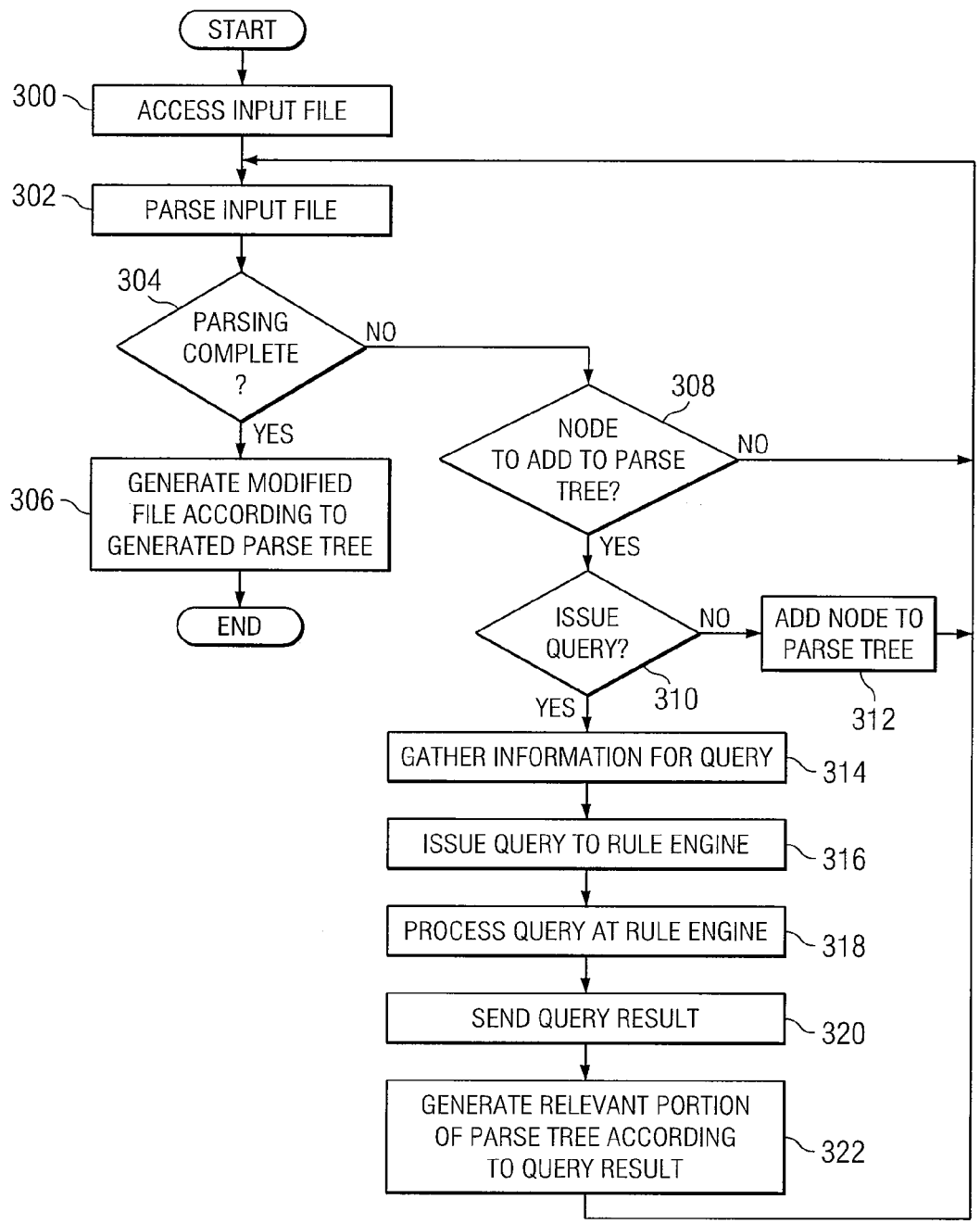
FIG. 3 illustrates an example method for modifying an input file written in a formal language according to certain embodiments of the present invention.

FIG. 3 illustrates an example method for modifying an input file 18 written in a formal language according to certain embodiments of the present invention. The method described with reference to FIG. 3 may be one example of step 210 described above with reference to FIG. 2. At step 300, input file 18 may be accessed. Input file 18 may be accessed in any suitable manner, such as being received over a network or accessed from a disk or other suitable memory module (removable or non-removable) of user system 12 for example. In certain embodiments, parser 14 accesses input file 18. Although a single input file 18 is described, the present invention contemplates accessing any suitable number of input files 18. As described above, input file 18 may be written in a formal language.

At step 302, parser 14 may parse input file 18. For example, parser 14 may begin parsing input file 18. Parser 14 may parse input file 18 to generate a parse tree of input file 18. At step 304, parser 14 may determine whether parsing of input file 18 is complete. Parser 14 may determine that parsing of input file 18 is complete for any suitable reason. For example, if parser 14 has parsed all of input file 18, it may be determined that parsing of input file 18 is complete. If it is determined at step 304 that parsing of input file 18 is complete, then at step 306, modified file 20 may be generated according to the parse tree generated by parser 14.

If it is determined at step 304 that parsing of input file 18 is not complete, then at step 308, parser 14 may determine whether there is a node to add to the parse tree. If parser 14 determines at step 308 that there is not a node to add to the parse tree, then the method may return to step 302 at which parser 14 continues parsing input file 18. If parser 14 determines at step 308 that there is a node to add to the parse tree, then at step 310 parser 14 may determine whether to issue a query 22 to rule engine 16. In certain embodiments, parser 14 issues a query 22 before adding any node to the parse tree. In such embodiments, there may not be an explicit decision made regarding whether to issue a query 22. In certain other embodiments, parser 14 issues a query 22 only before adding certain nodes to the parse tree. The determination of whether to issue a query 22 before addition of a node to the parse tree may be made according to node scope hooks (e.g., or language modification hooks) inserted in the code of parser 14 by parser generator 26.

If it is determined at step 310 that a query 22 should not be issued, then at step 312 parser 14 may add the node to the parse tree and return to step 302 to continue parsing input file 18. If it is determined at step 310 that a query 22 should be issued to rule engine 16, then at step 314 parser 14 may gather information for query 22. For example, parser 14 may gather any relevant data to be sent along with query 22, as one or more parameters of query 22 for example. As a particular example, the parameters of query 22 may include a subset of the terminal symbols used to make up the parse tree node at which query 22 is being issued. The present invention contemplates parser 14 skipping step 314, if appropriate. At step 316, parser 14 may issue query 22 to rule engine 16. The issued query 22 may include a portion or all of the information gathered at step 314. Although a single query 22 is primarily described, parser 14 may communicate any suitable number of queries 22 for a given node.

At step 316, rule engine 16 may process query 22 received from parser 14. Rule engine 16 may process query 22 in any suitable manner, according to particular needs. In certain embodiments, rule engine 16 may analyze query 22, determine whether query 22 triggers one or more rules 30. For example, the one or more filters of rules 30 may enable relevant rules 30 to be evaluated in response to a query 22. For example, a subset of the terminal symbols used to make up the parse tree node for which the one or more rules 30 are being evaluated may be passed. This subset may be used by rule engine 16 to determine context and reply to the correct queries 22. The one or more filters may be used to determine whether the action associated with a rule 30 should be triggered in response to query 22.

If rule engine 16 determines that query 22 triggers a particular rule 30, rule engine 16 may determine the action for rule 30 and any suitable details for the action. In certain embodiments, the one or more actions of a rule 30 include one or more of the following: (1) a cancel action instructing parser 14 to stop parsing of input file 18; (2) an add action instructing parser 14 to add some text before the current node; (3) a delete action instructing parser 14- to delete the current node; and (4) an add_after action instructing parser 14 to add some text after the current node. Although these example actions are primarily described, the present invention contemplates rules 30 comprising any other suitable actions for modifying input file 18 according to particular needs. The one or more details relevant to the one or more actions may include any suitable information. For example, if the action is an add action or an add_after action, then the one or more details may include the content of the text to add to the parse tree. As another example, if the action is a cancel action, then the one or more details may include a justification for stopping parsing of input file 18.

At step 318, rule engine 16 may communicate a query result 24 to parser 14. Query result 24 may include an identification of the action resulting from query 22, any suitable details associated with the action, and any other suitable information. At step 320, parser 14 may generate the relevant portion of the parse tree according to query result 24. For example, parser 14 may generate the node according to query result 24 (which may include determining that the node should not be generated).

Parser 14 may execute the action when the rule gets fired to generate the relevant portion of the parse tree according to query result 24. In certain embodiments, the one or more actions of a rule 30 include one or more of the following: (1) a cancel action instructing parser 14 to stop parsing of input file 18, (2) an add action instructing parser 14 to add some text before the current node; (3) a delete action instructing parser 14 to delete the current node; and (4) an add_after action instructing parser 14 to add some text after the current node. Although these example actions are primarily described, the present invention contemplates rules 30 comprising any other suitable actions for modifying input file 18 according to particular needs. The one or more details relevant to the one or more actions may include any suitable information. For example, if the action is an add action or an add_after action, then the one or more details may include the content of the text to add to the parse tree. As another example, if the action is a cancel action, then the one or more details may include a justification for stopping parsing of input file 18. The one or more details may be included as part of query result 24. The method may return to step 302 at which parser 14 continues parsing input file 18.

Although particular methods for modifying a file written in a formal language have been described with reference to FIGS. 2-3, the present invention contemplates any suitable method for modifying a file written in a formal language in accordance with the present invention. Thus, certain of the steps described with reference to FIGS. 2-3 may take place simultaneously and/or in different orders than as shown. Moreover, components of system 10 may use methods with additional steps, fewer steps, and/or different steps, so long as the methods remain appropriate.

Example

A particular example of modifying a file 18 written in a formal language according to certain embodiments of the present invention will now be described. It will be understood that this example is provided for illustrative purposes only and should not be used to limit the present invention.

In this example, input file 18 comprises a JAVA computer program named echo.java, which is a simple computer program that is operable to echo to a computer display the first argument passed to the computer program. The source code of echo.java may include the following:

```
public class echo {
    public static void main(String[ ] args) {
        System.out.println("args[0]: " + args[0]);
    }
}
```

Figure 4A:
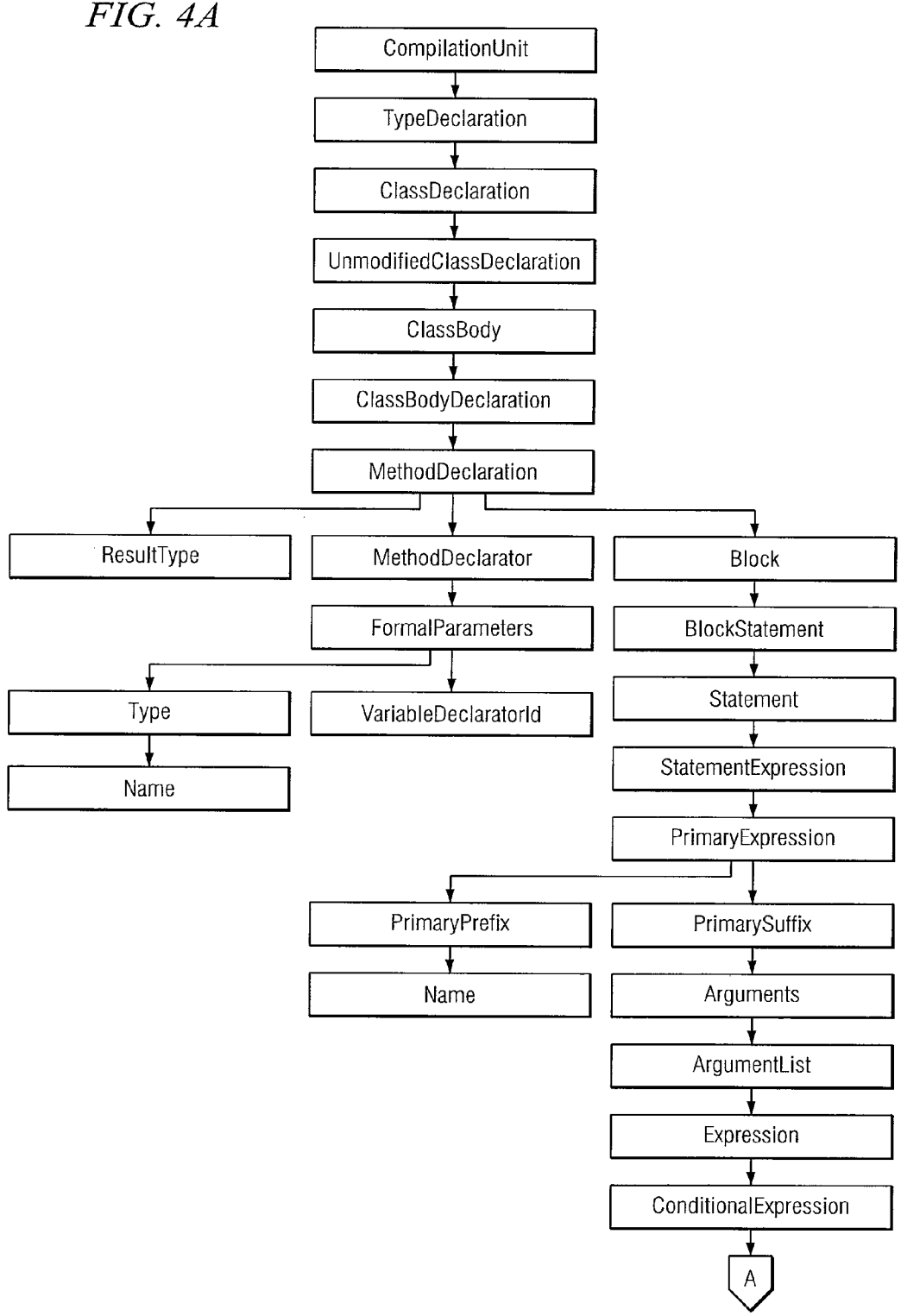
FIGS. 4A-4C illustrate an example syntax tree of the example echo.java computer program, according to a JAVA grammar.
Figure 4B:
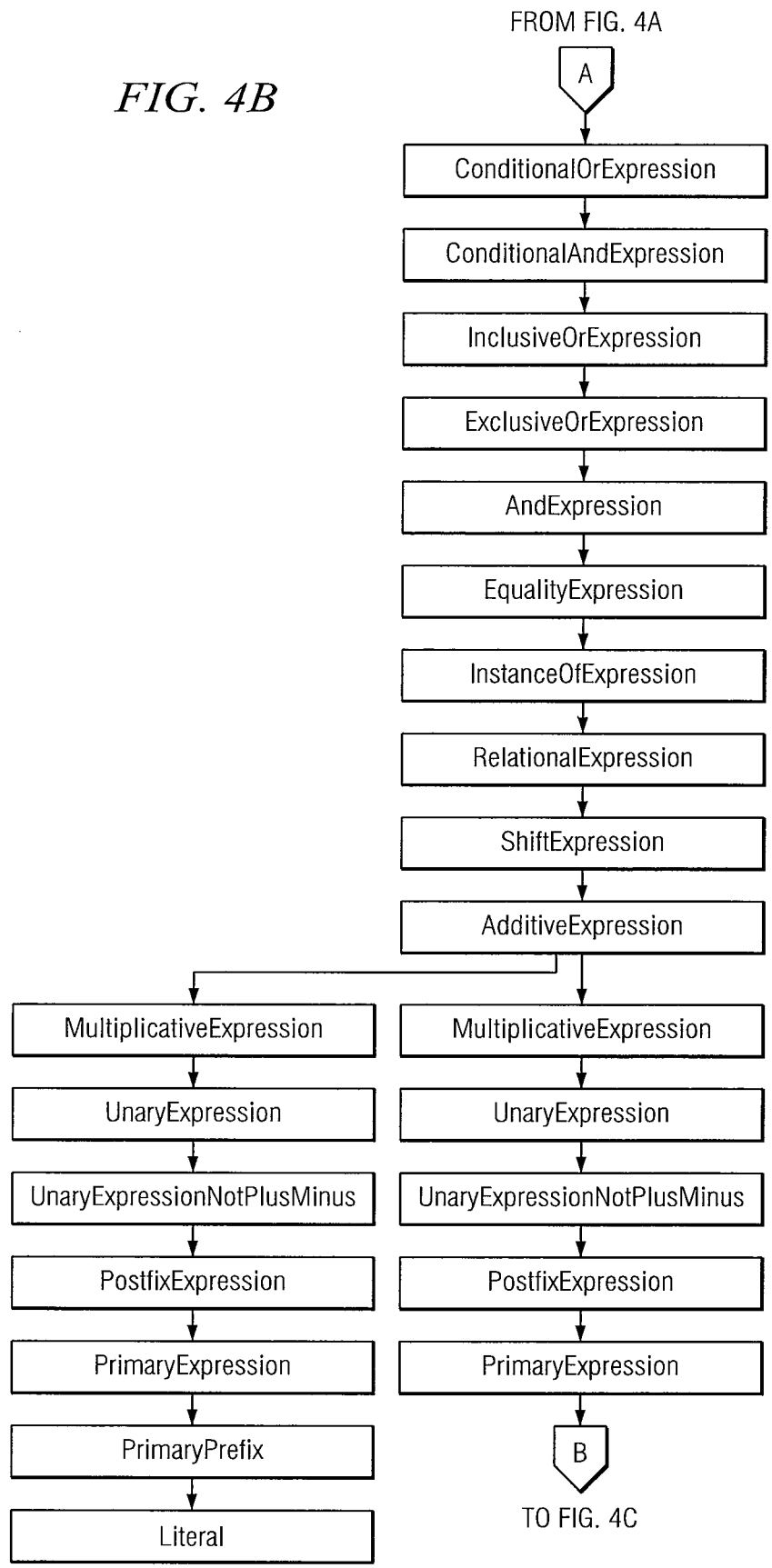
Figure 4C:
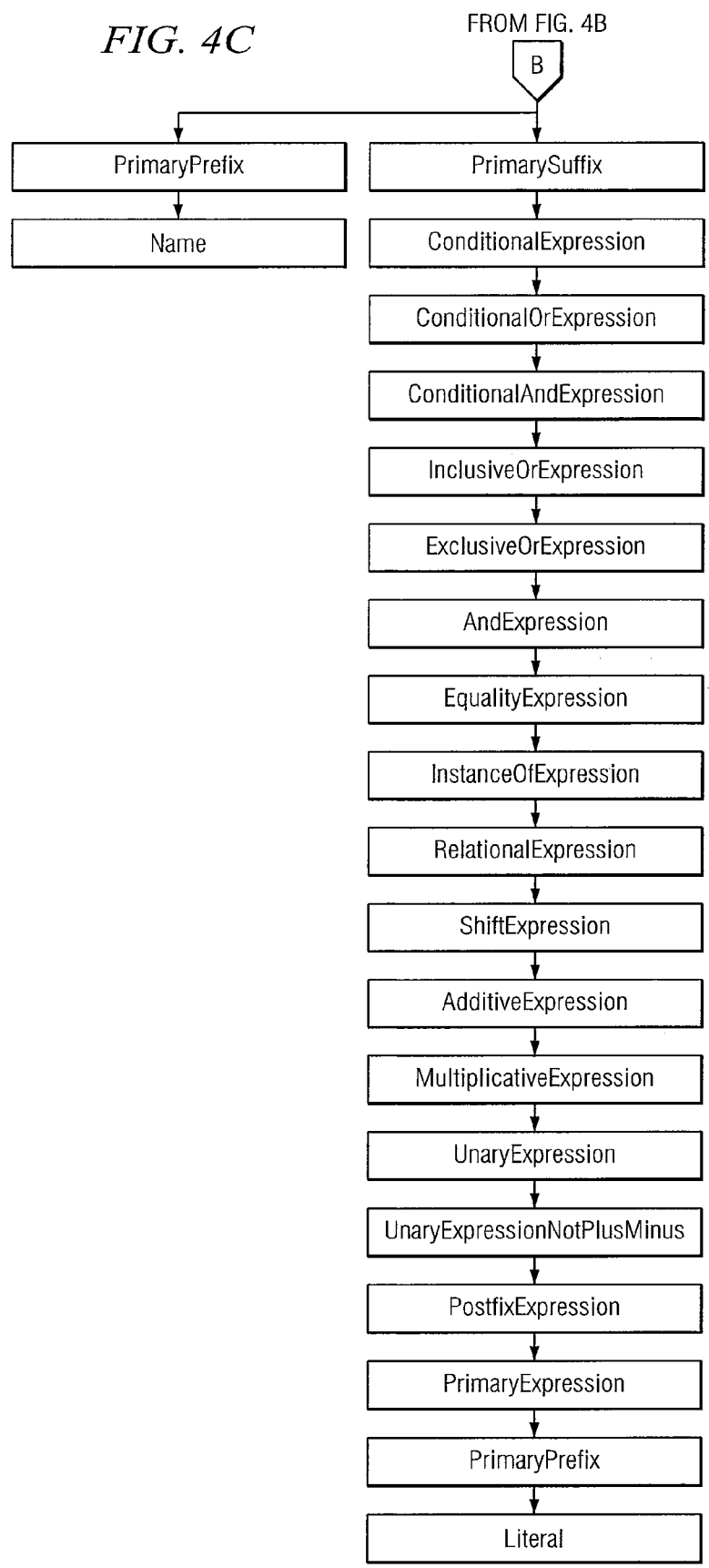

FIGS. 4A-4C illustrate an example syntax tree of the example echo.java computer program, according to the JAVA grammar.

A listing of example queries that may be sent by parser 14 to rule engine 16 (in text format) are listed below.

'ResultType'(['void'], Action, Text).
'Name'(['String'], Action, Text).
'Type'(['String', '[', ']'], Action, Text).
'VariableDeclaratorId'(['args'], Action, Text).
'FormalParameter'(['String', '[', ']', 'args'], Action, Text).
'FormalParameters'(['(', 'String', '[', ']', 'args', ')'], Action, Text).
'MethodDeclarator'(['main', '(', 'String', '[', ']', 'args', ')'], Action, Text).
'Name'(['System', '.', 'out', '.', 'println'], Action, Text).
'PrimaryPrefix'(['System', '.', 'out', '.', 'println'], Action, Text).
'Literal'(['"args[0]: "'], Action, Text).
'PrimaryPrefix'(['"args[0]: "'], Action, Text).
'PrimaryExpression'(['"args[0]: "'], Action, Text).
'PostfixExpression'(['"args[0]: "'], Action, Text).
'UnaryExpressionNotPlusMinus'(['"args[0]: "'], Action, Text).
'UnaryExpression'(['"args[0]: "'], Action, Text).
'MultiplicativeExpression'(['"args[0]: "'], Action, Text).
'Name'(['args'], Action, Text).
'PrimaryPrefix'(['args'], Action, Text).
'Literal'(['0'], Action, Text).
'PrimaryPrefix'(['0'], Action, Text).
'PrimaryExpression'(['0'], Action, Text).
'PostfixExpression'(['0'], Action, Text).
'UnaryExpressionNotPlusMinus'(['0'], Action, Text).
'UnaryExpression'(['0'], Action, Text).
'MultiplicativeExpression'(['0'], Action, Text).
'AdditiveExpression'(['0'], Action, Text).

-continued

```
'ShiftExpression'(['0'], Action, Text).
'RelationalExpression'(['0'], Action, Text).
'InstanceOfExpression'(['0'], Action, Text).
'EqualityExpression'(['0'], Action, Text).
'AndExpression'(['0'], Action, Text).
'ExclusiveOrExpression'(['0'], Action, Text).
'InclusiveOrExpression'(['0'], Action, Text).
'ConditionalAndExpression'(['0'], Action, Text).
'ConditionalOrExpression'(['0'], Action, Text).
'ConditionalExpression'(['0'], Action, Text).
'Expression'(['0'], Action, Text).
'PrimarySuffix'(['[', '0', ']'], Action, Text).
'PrimaryExpression'(['args', '[', '0', ']'], Action, Text).
'PostfixExpression'(['args', '[', '0', ']'], Action, Text).
'UnaryExpressionNotPlusMinus'(['args', '[', '0', ']'], Action, Text).
'UnaryExpression'(['args', '[', '0', ']'], Action, Text).
'MultiplicativeExpression'(['args', '[', '0', ']'], Action, Text).
'AdditiveExpression'(['"args[0]: "', '<PLUS>', 'args', '[', '0', ']'],
    Action, Text).
'ShiftExpression'(['"args[0]: "', '<PLUS>', 'args', '[', '0', ']'], Action,
    Text).
'RelationalExpression'(['"args[0]: "', '<PLUS>', 'args', '[', '0', ']'],
    Action, Text).
'InstanceOfExpression'(['"args[0]: "', '<PLUS>', 'args', '[', '0', ']'],
    Action, Text).
'EqualityExpression'(['"args[0]: "', '<PLUS>', 'args', '[', '0', ']'],
    Action, Text).
'AndExpression'(['"args[0]: "', '<PLUS>', 'args', '[', '0', ']'], Action,
    Text).
'ExclusiveOrExpression'(['"args[0]: "', '<PLUS>', 'args', '[', '0', ']'],
    Action, Text).
'InclusiveOrExpression'(['"args[0]: "', '<PLUS>', 'args', '[', '0', ']'],
    Action, Text).
'ConditionalAndExpression'(['"args[0]: "', '<PLUS>', 'args', '[', '0', ']'],
    Action, Text).
'ConditionalOrExpression'(['"args[0]: "', '<PLUS>', 'args', '[', '0', ']'],
    Action, Text).
'ConditionalExpression'(['"args[0]: "', '<PLUS>', 'args', '[', '0', ']'],
    Action, Text).
'Expression'(['"args[0]: "', '<PLUS>', 'args', '[', '0', ']'], Action, Text).
'ArgumentList'(['"args[0]: "', '<PLUS>', 'args', '[', '0', ']'], Action,
    Text).
'Arguments'(['(', '"args[0]: "', '<PLUS>', 'args', '[', '0', ']', ')'], Action,
    Text).
'PrimarySuffix'(['(', '"args[0]: "', '<PLUS>', 'args', '[', '0', ']', ')'],
    Action, Text).
'PrimaryExpression'(['System', '.', 'out', '.', 'println', '(', '"args[0]: "',
    '<PLUS>', 'args', '[', '0', ']', ')'], Action, Text).
'StatementExpression'(['System', '.', 'out', '.', 'println', '(', '"args[0]: "',
    '<PLUS>', 'args', '[', '0', ']', ')'], Action, Text).
'Statement'(['System', '.', 'out', '.', 'println', '(', '"args[0]: "',
    '<PLUS>', 'args', '[', '0', ']', ')', ';'], Action, Text).
'BlockStatement'(['System', '.', 'out', '.', 'println', '(', '"args[0]: "',
    '<PLUS>', 'args', '[', '0', ']', ')', ';'], Action, Text).
'Block'(['{', 'System', '.', 'out', '.', 'println', '(', '"args[0]: "',
    '<PLUS>', 'args', '[', '0', ']', ')', ';', '}'], Action, Text).
'MethodDeclaration'(['public', 'static', 'void', 'main', '(', 'String', '[',
    ']', 'args', ')', '{', 'System', '.', 'out', '.', 'println', '(',
    '"args[0]: "', '<PLUS>', 'args', '[', '0', ']', ')', ';',
    '}'], Action, Text).
'ClassBodyDeclaration'(['public', 'static', 'void', 'main', '(', 'String', '[',
    ']', 'args', ')', '{', 'System', '.', 'out', '.', 'println', '(', '"args[0]: "',
    '<PLUS>', 'args', '[', '0', ']', ')', ';', '}'], Action, Text).
'ClassBody'(['{', 'public', 'static', 'void', 'main', '(', 'String', '[', ']',
    'args', ')', '{', 'System', '.', 'out', '.', 'println', '(', '"args[0]: "',
    '<PLUS>', 'args', '[', '0', ']', ')', ';', '}', '}'], Action, Text).
'UnmodifiedClassDeclaration'(['class', 'echo', '{', 'public', 'static',
    'void', 'main', '(', 'String', '[', ']', 'args', ')', '{', 'System', '.',
    'out', '.', 'println', '(', '"args[0]: "', '<PLUS>', 'args', '[', '0', ']', ')',
    ';', '}', '}'], Action, Text).
'ClassDeclaration'(['public', 'class', 'echo', '{', 'public', 'static', 'void',
    'main', '(', 'String', '[', ']', 'args', ')', '{', 'System', '.', 'out', '.',
    'println', '(', '"args[0]: "', '<PLUS>', 'args', '[', '0', ']', ')', ';', '}',
    '}'], Action, Text).
'TypeDeclaration'(['public', 'class', 'echo', '{', 'public', 'static', 'void',
    'main', '(', 'String', '[', ']', 'args', ')', '{', 'System', '.', 'out', '.',
    'println', '(', '"args[0]: "', '<PLUS>', 'args', '[', '0', ']', ')', ';', '}',
    '}'], Action, Text).
'CompilationUnit'(['public', 'class', 'echo', '{', 'public', 'static', 'void',
    'main', '(', 'String', '[', ']', 'args', ')', '{', 'System', '.', 'out', '.',
    'println', '(', '"args[0]: "', '<PLUS>', 'args', '[', '0', ']', ')', ';',
    '}', '}', ''], Action, Text).
```

Program successfully processed.

A first set of rules 30 may be provided. The first set of rules 30 is operable to modify echo.java to add the system time to all print statements in a JAVA computer program. The first set of rules 30 may be stored as printTime.plg. For purposes of this example, the first set of rules 30 are written in ProLog format. The first set of rules 30 may be as follows.

```
/* System.out.println change */
'Name'(['System', '.', 'out', '.', 'println'], dummy, dummy):-
    assertz(printlnMethod), assertz(printStatement).
'ArgumentList'(_, add, '"[" + new java.util.Date( ).toString( ) + "]" + '):-
    printStatement, retract(printStatement).
```

The modified file 20 (i.e., echo.java.printTime) that results from application of the first set of rules 30 to input file 18 (i.e., echo.java) may be as follows.

```
public class echo {
    public static void main (String[ ] args) {
        System.out.println("[" + new jaa.util.Date( ).toString( ) +
"] " + "args[0]: " + args[0]);
    }
}
```

A second set of rules 30 may be provided. The second set of rules 30 is operable to modify echo.java to direct all print statements in a JAVA computer program (e.g., echo.java) to a log file. The second set of rules 30 may be stored as printToLog.plg. For purposes of this example, the second set of rules 30 are written in ProLog format. The second set of rules 30 may be as follows.

```
/* System.out.println change */
'Name'(['System', '.', 'out', '.', 'println'], delete,
    dummy):- assertz(printlnMethod), assertz(printStatement).
'Name'(['System', '.', 'out', '.', _],add, '<newLine>try {<newLine>
    java.io.FileWriter       logFile       =       new
    java.io.FileWriter("application.log",      true);<newLine>
    logFile.write').
'ArgumentList'(_, Action, Text):-printlnMethod, println(Action, Text).
'Statement'(_, Action, Text):-printStatement, printCatch(Action, Text).
/* Utility predicates */
println(addAfter, '+ "\r\n"'):-retract(printlnMethod).
printCatch(addAfter, '     logFile.close( );<newLine>}     catch
    (java.io.IOException      e)         {<newLine>
    e.printStackTrace( );<newLine>}'):-retract(printStatement).
```

The modified file 20 (i.e., echo.java.printToLog) that results from application of the second set of rules 30 to input file 18 (i.e., echo.java) may be as follows.

```
public class echo {
    public static void main(String[ ] args)
    try {
        java.io.FileWriter logFile = new java.io.FileWriter
            ("application.log", true);
        logFile.write("args[0]: "+args[0] + "\n");
        logFile.close( );
    }
    catch (java.io.IOException e) {
```

```
        e.printStackTrace( );
    }
  }
}
```

In certain embodiments, the first and second sets of rules 30 (i.e., printTime.plg and printToLog.plg) may be used to modify multiple JAVA programs (in some cases, any JAVA program) without changing parser 14 and other files used to parse the multiple JAVA programs. For example, depending on the desired change to a JAVA input file 18, it may only be necessary to modify sets of rules 30 to implement different modifications in the JAVA input file 18.

Although this invention has been described in terms of certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention.

What is claimed is:

1. A method for modifying a file written in a formal language, comprising:
   parsing, based on code of a parser, an input file written in a formal language to generate by the parser a data structure of the input file, the parser implemented using a formal language specification for the formal language of the input file;
   issuing, at an intermediate point in generation of the data structure of the input file by the parser and according to one or more query triggers in the code of the parser, one or more queries to a rule engine for evaluation of a first plurality of rules for modifying the input file, wherein the one or more queries include a subset of terminal symbols used to make up the data structure, wherein modifying the input file comprises altering the functionality of the input file by altering computer code of the input file according to the first plurality of rules;
   the first plurality of rules comprising at least one rule distinct from the formal language specification used to implement the parser,
   the rule engine configured to analyze the one or more queries, determine whether the one or more queries trigger any of the first plurality of rules for modifying the input file, and communicate a query result to the parser, the query result instructing the parser to take an action in accordance with any of the triggered first plurality of rules as determined by the rule engine;
   generating, by the parser at the intermediate point, the data structure by executing the action indicated by the query result; and
   reusing the parser with a second plurality of rules distinct from the first plurality of rules.

2. The method of claim 1, further comprising generating a modified file according to the generated data structure.

3. The method of claim 1, further comprising defining the formal language specification for the formal language of the input file.

4. The method of claim 3, comprising generating, according to the formal language specification for the formal language of the input file, the parser for parsing the input file.

5. The method of claim 4, wherein the parser is generated using a Java Compiler-Compiler (JAVACC).

6. The method of claim 1, wherein:
   the data structure comprises a parse tree; and
   the method comprises issuing at least one of the one or more queries before addition of one or more nodes to the parse tree.

7. The method of claim 1, wherein:
   the rule engine comprises a programming language database; and
   the method comprises defining the first plurality of rules using the programming language.

8. The method of claim 1, wherein any of the first plurality of rules comprises one or more of the following:
   a name portion;
   one or more filters;
   one or more actions; and
   one or more details relevant to the one or more actions.

9. The method of claim 1, wherein the action specified by any of the first plurality of rules comprises one or more of the following:
   a cancel action instructing the parser to stop parsing the input file;
   an add action instructing the parser to add text before a current node of the data structure;
   a delete action instructing the parser to delete a current node of the data structure; and
   an add_after action instructing the parser to add text after a current node of the data structure.

10. The method of claim 9, wherein any of the first plurality of rules further comprises, if the action comprises an add action or an add_after action, a context of the text to add to the data structure.

11. The method of claim 1, wherein:
    the formal language of the input file comprises a first formal language; and
    modifying the input file comprises modifying the input file from the first formal language to a second formal language.

12. The method of claim 1, wherein the input file comprises a computer program.

13. A system for modifying a file written in a formal language, the system comprising a computer system comprising one or more processors and one or more memories, the one or more processors programmed with instructions to:
    parse, based on code of a parser, an input file written in a formal language to generate by the parser a data structure of the input file, the parser implemented using a formal language specification for the formal language of the input file;
    issue, at an intermediate point in generation of the data structure of the input file by the parser and according to one or more query triggers in the code of the parser, one or more queries to a rule engine for evaluation of a first plurality of rules for modifying the input file, wherein the one or more queries include a subset of terminal symbols used to make up the data structure, wherein modifying the input file comprises altering the functionality of the input file by altering computer code of the input file according to the first plurality of rules;
    the first plurality of rules comprising at least one rule distinct from the formal language specification used to implement the parser,
    the rule engine configured to analyze the one or more queries, determine whether the one or more queries trigger any of the first plurality of rules for modifying the input file, and communicate a query result to the parser, the query result instructing the parser to take an action in accordance with any of the triggered first plurality of rules as determined by the rule engine;
generate, at the intermediate point, the data structure by executing the action indicated by the query result; and
wherein the one or more processors are programmed with instructions to reuse the parser with a second plurality of rules distinct from the first plurality of rules.

14. The system of claim 13, wherein the one or more processors are further operable to generate a modified file according to the generated data structure.

15. The system of claim 13, wherein the one or more processors are further operable to define the formal language specification for the formal language of the input file.

16. The system of claim 15, wherein the one or more processors are operable to generate, according to the formal language specification for the formal language of the input file, the parser for parsing the input file.

17. The system of claim 16, wherein the parser is generated using a Java Compiler-Compiler (JAVACC).

18. The system of claim 13, wherein:
the data structure comprises a parse tree; and
the one or more processors are operable to issue at least one of the one or more queries before addition of one or more nodes to the parse tree.

19. The system of claim 13, wherein:
the rule engine comprises a programming language database; and
the first plurality of rules are defined using the programming language.

20. The system of claim 13, wherein any of the first plurality of rules comprises one or more of the following:
a name portion;
one or more filters;
one or more actions; and
one or more details relevant to the one or more actions.

21. The system of claim 13, wherein the action specified by any of the first plurality of rules comprises one or more of the following:
a cancel action instructing the parser to stop parsing the input file;
an add action instructing the parser to add text before a current node of the data structure;
a delete action instructing the parser to delete a current node of the data structure; and
an add_after action instructing the parser to add text after a current node of the data structure.

22. The system of claim 21, wherein any of the first plurality of rules further comprises, if the action comprises an add action or an add_after action, a context of the text to add to the data structure.

23. The system of claim 13, wherein:
the formal language of the input file comprises a first formal language; and
modifying the input file comprises modifying the input file from the first formal language to a second formal language.

24. The system of claim 13, wherein the input file comprises a computer program.

25. A non-transitory computer-readable medium comprising software for modifying a file written in a formal language, the software when executed operable to:
parse, based on code of a parser, an input file written in a formal language to generate by the parser a data structure of the input file, the parser implemented using a formal language specification for the formal language of the input file;
issue, at an intermediate point in generation of the data structure of the input file by the parser and according to one or more query triggers in the code of the parser, one or more queries to a rule engine for evaluation of a first plurality of rules for modifying the input file, wherein the one or more queries include a subset of terminal symbols used to make up the data structure, wherein modifying the input file comprises altering the functionality of the input file by altering computer code of the input file according to the first plurality of rules;
the first plurality of rules comprising at least one rule distinct from the formal language specification used to implement the parser,
the rule engine configured to analyze the one or more queries, determine whether the one or more queries trigger any of the first plurality of rules for modifying the input file, and communicate a query result to the parser, the query result instructing the parser to take an action in accordance with any of the triggered first plurality of rules as determined by the rule engine;
generate, at the intermediate point, the data structure by executing the action indicated by the query result; and
wherein the software when executed is operable to reuse the parser with a second plurality of rules distinct from the first plurality of rules.

26. The non-transitory computer-readable medium of claim 25, wherein the software when executed is further operable to generate a modified file according to the generated data structure.

27. The non-transitory computer-readable medium of claim 25, wherein the software when executed is further operable to define the formal language specification for the formal language of the input file.

28. The non-transitory computer-readable medium of claim 27, wherein the software when executed is operable to generate, according to the formal language specification for the formal language of the input file, the parser for parsing the input file.

29. The non-transitory computer-readable medium of claim 28, wherein the parser is generated using a Java Compiler-Compiler (JAVACC).

30. The non-transitory computer-readable medium of claim 25, wherein:
the data structure comprises a parse tree; and
the software when executed is operable to issue at least one of the one or more queries before addition of one or more nodes to the parse tree.

31. The non-transitory computer-readable medium of claim 25, wherein:
the rule engine comprises a programming language database; and
the first plurality of rules are defined using the programming language.

32. The non-transitory computer-readable medium of claim 25, wherein any of the first plurality of rules comprises one or more of the following:
a name portion;
one or more filters;
one or more actions; and
one or more details relevant to the one or more actions.

33. The non-transitory computer-readable medium of claim 25, wherein the action specified by any of the first plurality of rules comprises one or more of the following:
a cancel action instructing the parser to stop parsing the input file;
an add action instructing the parser to add text before a current node of the data structure;

a delete action instructing the parser to delete a current node of the data structure; and an add_after action instructing the parser to add text after a current node of the data structure.

34. The non-transitory computer-readable medium of claim 33, wherein any of the first plurality of rules further comprises, if the action comprises an add action or an add_after action, a context of the text to add to the data structure.

35. The non-transitory computer-readable medium of claim 25, wherein:

the formal language of the input file comprises a first formal language; and modifying the input file comprises modifying the input file from the first formal language to a second formal language.

36. The non-transitory computer-readable medium of claim 25, wherein the input file comprises a computer program.

* * * * *